(12) United States Patent
Joerg et al.

(10) Patent No.: US 12,235,134 B2
(45) Date of Patent: Feb. 25, 2025

(54) SENSOR FOR A MAGNETIC MEASURING DEVICE

(71) Applicant: Robert Bosch GmbH, Stuttgart (DE)

(72) Inventors: Martin Joerg, Wertach (DE); Mathias Kimmerle, Steinheim (DE); Peter Bigl, Fischen (DE)

(73) Assignee: Robert Bosch GmbH, Stuttgart (DE)

( * ) Notice: Subject to any disclaimer, the term of this patent is extended or adjusted under 35 U.S.C. 154(b) by 210 days.

(21) Appl. No.: 17/600,446

(22) PCT Filed: Mar. 24, 2020

(86) PCT No.: PCT/EP2020/058202
§ 371 (c)(1),
(2) Date: Sep. 30, 2021

(87) PCT Pub. No.: WO2020/207788
PCT Pub. Date: Oct. 15, 2020

(65) Prior Publication Data
US 2022/0196436 A1   Jun. 23, 2022

(30) Foreign Application Priority Data
Apr. 11, 2019  (DE) .................. 10 2019 205 193.6

(51) Int. Cl.
*G01D 5/14* (2006.01)
*G01B 7/14* (2006.01)
(Continued)

(52) U.S. Cl.
CPC ............... *G01D 5/145* (2013.01); *G01B 7/14* (2013.01); *G01B 7/30* (2013.01); *G01P 3/44* (2013.01)

(58) Field of Classification Search
CPC ........ G01D 5/142; G01D 5/145; G01D 5/147; G01D 5/16; G01D 5/165; G01D 2205/80;
(Continued)

(56) References Cited

U.S. PATENT DOCUMENTS 6,268,722 B1 * 7/2001 Kogure ................. G01D 5/145
324/207.2
2013/0241538 A1 * 9/2013 Akabane ................ G01B 7/30
324/207.25
(Continued)

FOREIGN PATENT DOCUMENTS

CN          105765348 A     7/2016
DE   10 2006 007 005 A1    9/2006
(Continued)

OTHER PUBLICATIONS

International Search Report corresponding to PCT Application No. PCT/EP2020/058202, mailed Jun. 8, 2020 (German and English language document) (7 pages).

*Primary Examiner* — David M Schindler
(74) *Attorney, Agent, or Firm* — Maginot, Moore & Beck LLP

(57) ABSTRACT

A sensor for a magnetic measuring device for detecting a rotational or translational movement of a body includes a permanent magnet which is connected to the body for conjoint rotation and which moves with the body. The sensor is fastened to a body by a method, and the sensor can be used in a magnetic measuring device for contactlessly detecting a rotational movement of a body. Plastic-bonded permanent magnet material is injection-molded onto the body, acting as an extension thereof, and forms a free end of the body acting as a permanent magnet.

12 Claims, 3 Drawing Sheets

(51) Int. Cl.
*G01B 7/30* (2006.01)
*G01P 3/44* (2006.01)

(58) Field of Classification Search
CPC ......... G01P 3/44; G01P 3/487; H01K 11/215; G01B 7/14; G01B 7/30
See application file for complete search history.

(56) References Cited

U.S. PATENT DOCUMENTS

| | | | | |
|---|---|---|---|---|
| 2015/0362335 | A1* | 12/2015 | Spitzer | G01B 7/30 310/68 B |
| 2016/0025516 | A1* | 1/2016 | Asano | G01D 5/24442 324/207.21 |
| 2016/0265940 | A1* | 9/2016 | Burgdorf | G01D 5/16 |
| 2017/0234699 | A1* | 8/2017 | Ausserlechner | G01D 5/145 324/207.2 |
| 2018/0031628 | A1* | 2/2018 | Ahrens | H02K 11/215 |
| 2018/0299296 | A1* | 10/2018 | Mori | H01F 1/057 |

FOREIGN PATENT DOCUMENTS

| | | |
|---|---|---|
| DE | 10 2015 201 411 A1 | 7/2016 |
| DE | 10 2015 122 182 A1 | 6/2017 |
| DE | 10 2016 207 659 A1 | 11/2017 |
| FR | 3 025 666 A1 | 3/2016 |
| JP | 4868753 B2 | 2/2012 |
| JP | 5205855 B2 | 3/2013 |
| JP | 2017009312 A * | 1/2017 |

* cited by examiner

SENSOR FOR A MAGNETIC MEASURING DEVICE

This application is a 35 U.S.C. § 371 National Stage Application of PCT/EP2020/058202, filed on Mar. 24, 2020, which claims the benefit of priority to Serial No. DE 10 2019 205 193.6, filed on Apr. 11, 2019 in Germany, the disclosures of which are incorporated herein by reference in their entirety.

The disclosure is based on a sensor for a magnetic measuring device, a method for fixing a sensor of this type to a body, and a magnetic measuring device for contactless detection of a movement of a body with a sensor of this type.

BACKGROUND

In the case of known brake systems with ESP functionality and/or ABS functionality (ESP: electronic stability program, ABS: anti-lock braking system), a direct current motor is usually used, in order to operate at least one hydraulic pump via an eccentric for pumping brake fluid. This is usually speed controlled or fully controlled direct current motors. A rotor position indication for controlling the direct current motors can be carried out by means of a permanent magnet which is assembled on the motor shaft, for example. A cup made of a non-magnetic material is currently used for receiving the permanent magnet and for fixing it to the motor shaft. In this case, an angle of the magnetic field lines of the permanent magnet co-rotating with the motor shaft can be detected by a measurement transducer by means of the TMR principle (TMR: tunnel magnetoresistive effect). In this case, the permanent magnet is positioned and permanently fixed on the motor shaft with high precision relative to the measurement transducer. Relative movements (axial and radial) between the permanent magnet and the motor shaft are not permitted in this case. The permanent magnet is therefore glued to the cup by means of thermosetting adhesive. In addition, the motor shaft has a front bore for receiving a press plug of the cup, so that the cup can be permanently fixed to the motor shaft via a press fit. The cup base serves as a magnetic insulation section between the permanent magnet and the soft magnetic motor shaft. This reduces an outflow of the useful magnetic field into the motor shaft.

A motor-pump assembly for a brake system with an electric motor which has a motor shaft is known from DE 10 2015 201 411 A1. The motor shaft drives at least one fluid pump which is arranged in a pump housing. In this case, a control apparatus is arranged at the pump housing and sets a current rpm and/or a current torque of the electric motor, wherein the control apparatus detects in a contactless manner a current rotation angle of the motor shaft via a sensor arrangement, which comprises a sensor and a magnetic measurement transducer, and evaluates it for controlling the electric motor. The sensor is arranged at a free end of the motor shaft inside the pump housing and, depending on the rotational movement of the motor shaft, influences at least one magnetic variable of a magnetic field detected by the magnetic measurement transducer which is arranged in the control apparatus in a stationary manner.

An actuator device for a vehicle, in particular for a brake system of a motor vehicle, with at least one electronically commutated electric motor, which has a rotor arranged in a rotationally fixed manner on a rotatably mounted shaft, and with at least one rotation angle sensor for detecting a rotational position of the rotor, is known from DE 10 2016 207 659 A1. In this case, the rotation angle sensor is arranged opposite a front side of the shaft. In addition, the end or rather the front side of the shaft has at least one rotary encoder. The rotary encoder can be a permanent magnet, for example, which is fixedly connected to the shaft and thus co-rotates with it. The rotation angle sensor then detects the magnetic field of the rotary encoder, wherein the rotation angle position of the shaft and thus that of the rotor is detected or rather determined depending on the detected magnetic field.

SUMMARY

The sensor for a magnetic measuring device with the features described herein, the method for fixing a sensor described herein, and the measuring device for contactless detection of a movement of a body with the features described herein have the advantage that a significant reduction of manufacturing steps and/or assembly steps is possible. By injection molding plastic bonded permanent magnetic material, gluing the permanent magnet into a receiving cup and compressing the receiving cup with an opening in the body is no longer necessary. In addition, the reduction in the number of individual components results in an improved positioning accuracy and thus also in a shorter tolerance chain. Owing to the elimination of the cup base and the adhesive gap, the direct injection molding of the plastic bonded permanent magnetic material and the permanent magnet formed therefrom results in a significantly shorter axial tolerance chain. Owing to the elimination of the cup assembly in the body, the assembly of the permanent magnet in the magnetic cup and the elimination of the eccentricities of the individual components, the direct injection molding of the plastic bonded permanent magnetic material and the permanent magnet formed therefrom results in a significantly shorter radial tolerance chain, wherein the effective diameter of the permanent magnet can additionally be increased, such that more cost effective magnetic materials can be used. In addition, a relative movement between the permanent magnet and the body is advantageously not possible owing to the inseparable connection of the permanent magnet and the body as a result of the injection-molded plastic bonded permanent magnetic material. Likewise, a reduced assembly distance between the measurement transducer and the permanent magnet on the body is possible with improved tolerance position at the same time. The design of the permanent magnet as an injection-molded component advantageously results in extended design possibilities for the front surface of the permanent magnet or rather the free end of the body with regard to subsequent assembly processes, such as when assembling a moving body designed as a shaft in an eccentric bearing or a motor assembly with the moving body designed as a shaft in a pump housing, for example.

Embodiments of the present disclosure provide a sensor for a magnetic measuring device for detecting a rotational or translational movement of a body, with a permanent magnet which is connected in a rotationally fixed manner to the body and moves together with the body. In this case, a plastic bonded permanent magnetic material is injection molded onto the body as an extension and forms a free end of the body as a permanent magnet.

In addition, a method for fixing a sensor to a body is proposed. The method comprises the steps: providing the body at the free end of which a fixing geometry is formed, inserting the free end of the body with the fixing geometry into a cavity of an injection molding tool, introducing plastic bonded permanent magnetic material into the cavity of the injection molding tool, such that the cured plastic bonded permanent magnetic material forms a free end of the body as an extension of the body, and magnetizing the permanent magnetic material in order to form a permanent magnet.

Moreover, a magnetic measuring device for contactless detection of a rotational movement of a body, with a sensor of this type, which is connected in a rotationally fixed manner to the body, and a measurement transducer which is arranged in a stationary manner, is proposed. In this case, depending on the movement of the body, the sensor influences at least one magnetic variable of a magnetic field detected by the measurement transducer.

The sensor and the magnetic measuring device can be used in a motor-pump assembly for a brake system, for example, in order to determine a current rotation angle of a motor shaft or of a rotor and/or a rotation speed and/or rpm of a motor shaft or of a rotor.

The measures and developments identified herein enable advantageous improvements to the sensor for a magnetic measuring device and to the method for fixing a sensor to a body, as well as to the measuring device for contactless detection of a movement of a body.

The moving body can be designed as a rotatably mounted shaft or as a translationally movably mounted rod, for example.

It is particularly advantageous for the permanent magnet to be able to be diametrically magnetized or magnetized at its front surface or magnetized in a multipolar manner. This makes it possible to generate in a simple manner a magnetic field which changes periodically based on a rotational movement of the body designed as a shaft and which can be detected and evaluated by a measurement transducer, for example.

In one advantageous configuration of the sensor, a fixing geometry can be formed at the free end of the moving body, which fixing geometry can be enclosed by the permanent magnet in such a way that a radial and axial positive engagement is formed between the permanent magnet and the moving body. This means that the fixing geometry axially protrudes from a front surface of the body and can be manufactured in a simple manner. In this case, the fixing geometry can be designed as an axially protruding structure with a mushroom-shaped cross section and a surrounding undercut, for example. Alternatively, the fixing geometry can be designed as a recess with a mushroom-shaped cross section and a surrounding undercut.

In one further advantageous configuration of the sensor, a non-magnetic section can be formed between the permanent magnet and the body. This non-magnetic section serves as a magnetic insulation section between the permanent magnet and the body, which is preferably manufactured from a soft magnetic material. This makes it possible to advantageously reduce an outflow of the useful magnetic field of the permanent magnet into the soft magnetic body.

In one advantageous configuration of the method, the permanent magnetic material can be integrated into granules of an injection-moldable plastics material before being introduced into the cavity of the injection molding tool. Alternatively, the permanent magnetic material in powder form can be mixed with injection-moldable plastics material before being introduced into the cavity of the injection molding tool. Hydrolysis-stable plastics materials such as PBT (polybutylene terephthalate), polyamides (PA66) etc., for example, are preferably used as plastics material. Ferrites or neodymium iron boron (NdFeB) can be used as permanent magnetic materials, for example. Cost effective ferrites may preferably be used for larger models.

In one further advantageous configuration of the method, the fixing geometry of the body can be designed in such a way and the plastic bonded permanent magnetic material introduced into the cavity of the injection molding tool in such a manner that, after curing the introduced plastics material, a radial and axial positive engagement is formed between the permanent magnet formed therefrom and the fixing geometry of the body.

In one advantageous configuration of the magnetic measuring device, in the case of the body designed as a shaft, the influence of the magnetic field detected by the measurement transducer can be evaluated, in order to calculate a current rotation angle and/or a current rotation speed of the shaft. In the case of the body designed as a rod, the influence of the magnetic field detected by the measurement transducer can be evaluated, in order to calculate a current distance covered and/or a current speed of displacement of the rod. The measurement transducer can be designed as a TMR sensor (TMR: tunnel magnetoresistive effect), for example. These sensors can advantageously be obtained or manufactured in large quantities in a cost effective manner.

In one further advantageous configuration of the magnetic measuring device, the free end of the moving body with the permanent magnet can project into a hollow space. In this case, the measurement transducer can be arranged inside or outside the hollow space. This makes it possible to preset a short distance and thus an air gap between the sensor or rather the permanent magnet and the measurement transducer.

In one further advantageous configuration of the magnetic measuring device, the measurement transducer and a sensor interface can be arranged in a common ASIC module (ASIC: application-specific integrated circuit).

BRIEF DESCRIPTION OF THE DRAWINGS

Exemplary embodiments of the disclosure are represented in the drawings and are explained in greater detail in the subsequent description. In the drawings, the same reference numbers refer to components or elements which perform the same or analog functions.

DETAILED DESCRIPTION

Figure 1:
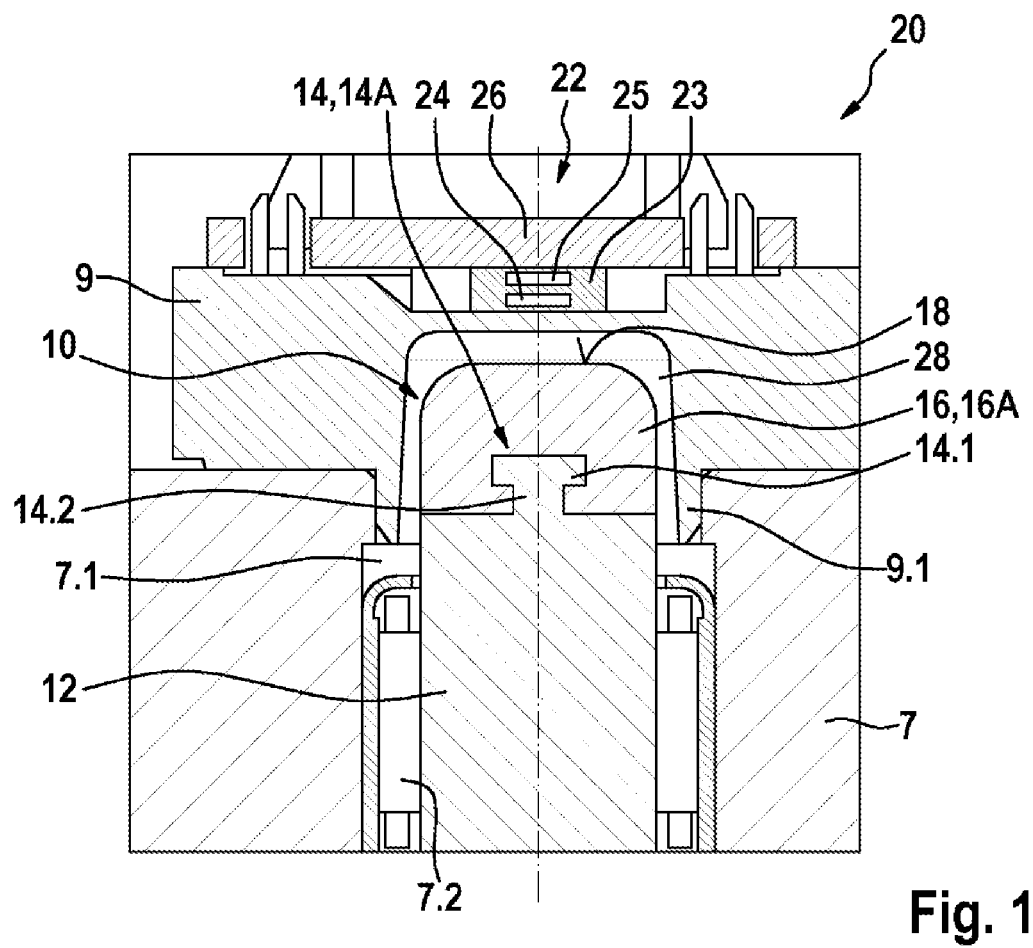
FIG. 1 shows a schematic sectional representation of an end section of a pump housing with an exemplary embodiment of a magnetic measuring device according to the disclosure for contactless detection of a rotational movement of a body designed as a shaft with an exemplary embodiment of a sensor according to the disclosure.
Figure 2:
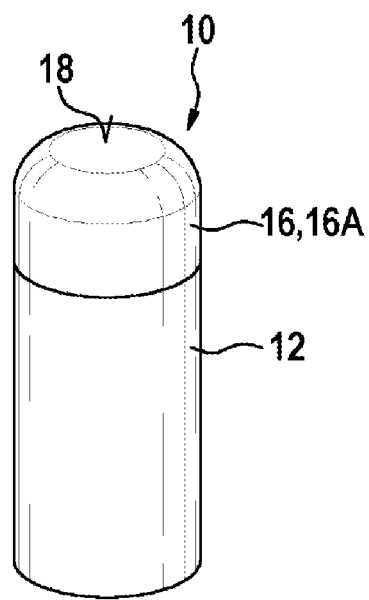
FIG. 2 shows a schematic perspective representation of a body designed as a shaft with the sensor according to the disclosure from FIG. 1.

As can be seen in FIGS. 1 and 2, the represented exemplary embodiment of a magnetic measuring device 20 according to the disclosure for contactless detection of a movement of a body 10 comprises a sensor 16, which is connected in a rotationally fixed manner to the body 10, and a measurement transducer 24 which is arranged in a stationary manner. Depending on the movement of the body 10, the sensor 16 influences at least one magnetic variable of a magnetic field detected by the measurement transducer 24.

As can further be seen in FIGS. 1 and 2, the sensor 16 for the magnetic measuring device 20 comprises a permanent magnet 16A which is connected in a rotationally fixed manner to the body 10 and moves together with the body 10. In this case, a plastic bonded permanent magnetic material is injection molded onto the body 10 as an extension and forms a free end of the body 10 as a permanent magnet 16A.

As can further be seen in FIGS. 1 and 2, in the exemplary embodiment represented, the moving body 10 is designed as a rotatably mounted shaft 12, the free end of which with the permanent magnet 16A projects into a hollow space 28 which is formed in a connection adaptor 9. In an alternative exemplary embodiment which is not represented, the moving body 10 is designed as a translationally mounted rod. As can further be seen in FIG. 1, the shaft 12 is designed as a motor shaft and is rotatably mounted in a motor bore 7.1, which is introduced into a pump housing 7, via a motor bearing 7.2. The connection adaptor 9 is pressed into the motor bore 7.1 via press-in ribs 9.1.

As can further be seen in FIG. 1, the measuring device 20 comprises an electronic sensor system 22 which is arranged on a printed circuit board 26 and which has a measurement transducer 24 and a sensor interface 25. In the represented exemplary embodiment of the measuring device 20, the sensor interface 25 and the measurement transducer 24 are arranged in a common ASIC module 23. As can further be seen in FIG. 1, the printed circuit board 26 is held on the connection adaptor 9 in such a way that the distance between the measurement transducer 24 and the sensor 16 is as small as possible. In the exemplary embodiment represented, the measurement transducer 24 is arranged in a recess in the connection adaptor 9 at a dividing wall above the hollow space 28, into which the free end of the shaft 12 with the permanent magnet 16A projects. The sensor interface 25 outputs output signals of the measurement transducer 24 to an evaluation and control unit which is not represented, which signals represent the influence of the magnetic field detected by the measurement transducer 24. The evaluation and control unit is arranged in a superordinate control apparatus, for example, and evaluates the output signals of the measurement transducer 24 received from the sensor interface 25, in order to calculate a current rotation angle and/or a current rotation speed of the shaft 12. In the exemplary embodiment represented, the shaft 12 is designed as a motor shaft of a controlled direct current motor or an EC motor (EC motor: electronically commutated motor). In the exemplary embodiment represented, the permanent magnet 16A is diametrically magnetized for generating a periodic change in the magnetic field depending on the rotational movement of the shaft 12. In an alternative exemplary embodiment which is not represented, the permanent magnet 16A is magnetized at its front surface or magnetized in a multipolar manner.

As can further be seen in FIGS. 1 and 2, the outer form of the permanent magnet 16A is adapted to the contour of the measuring space 28, wherein the transition between the front surface and lateral surface of the permanent magnet 16A is designed to be rounded. The rounded edges of the permanent magnet 16A facilitate the insertion of the free end of the shaft 12 into the hollow space 28 in the connection adaptor 9. In the exemplary embodiment represented, the outer diameter of the permanent magnet 16A corresponds to the outer diameter of the shaft 12. In order to improve the homogeneity of the magnetic field of the permanent magnet 16A, the permanent magnet 16A is designed with an outer diameter which is as large as possible. In one exemplary embodiment of the sensor 16 which is not represented, the permanent magnet 16A can have a stepped design. This means that the outer diameter of the permanent magnet 16A is designed to be larger or smaller than the outer diameter of the shaft 12.

Figure 4:
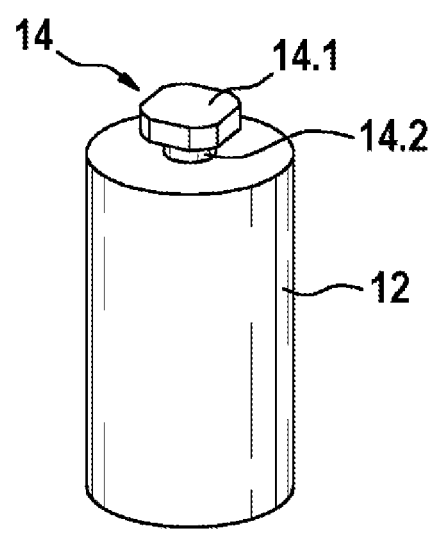
FIG. 4 shows a schematic perspective representation of an exemplary embodiment of a body designed as a shaft, which is to be connected to a sensor according to the disclosure.

As can further be seen in FIGS. 1 and 4, a fixing geometry 14 is formed at the end of the shaft 12, which fixing geometry is enclosed by the permanent magnet 16A, such that a radial and axial positive engagement is formed between the permanent magnet 16A and the shaft 12.

In the exemplary embodiment represented, the fixing geometry 14 is designed as a protruding structure 14 with a mushroom-shaped cross section and a surrounding undercut. This means that a cap 14.1 of the mushroom-shaped cross section has a larger diameter than a stem 14.2 of the mushroom-shaped cross section. In one exemplary embodiment of the sensor 16 which is not represented, the fixing geometry 14 can be designed as a recess with a mushroom-shaped cross section and a surrounding undercut. In one further exemplary embodiment of the sensor 16 which is not represented, a non-magnetic section is formed between the permanent magnet 16A and the shaft 12 as a magnetic insulation section between the permanent magnet 16A and the shaft 12, in order to advantageously reduce an outflow of the useful magnetic field of the permanent magnet 16A into the soft magnetic shaft 12.

Figure 3:
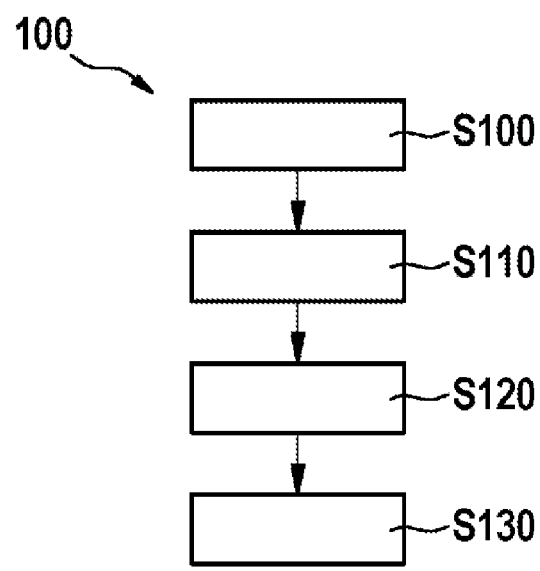
FIG. 3 shows a schematic flow diagram of an exemplary embodiment of a method according to the disclosure for fixing a sensor to a moving body.
Figure 5:
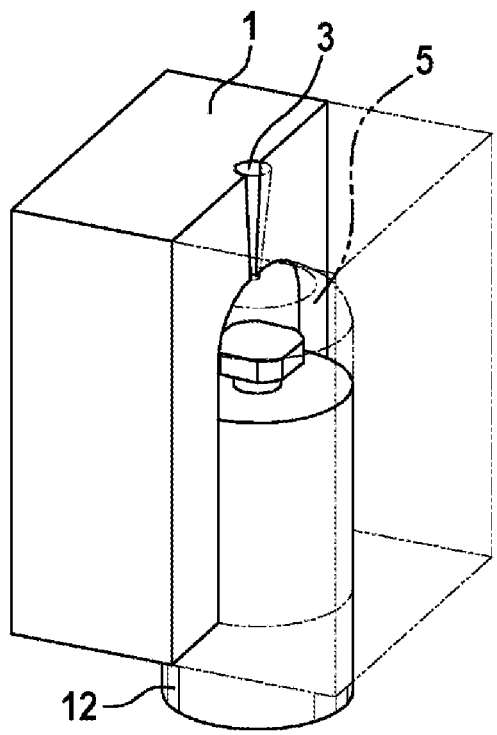
FIG. 5 shows a schematic perspective partially transparent representation of an exemplary embodiment of an injection molding tool before a plastic bonded permanent magnetic material has been introduced, wherein the body designed as a shaft from FIG. 4 is introduced into a cavity of the injection molding tool.
Figure 6:
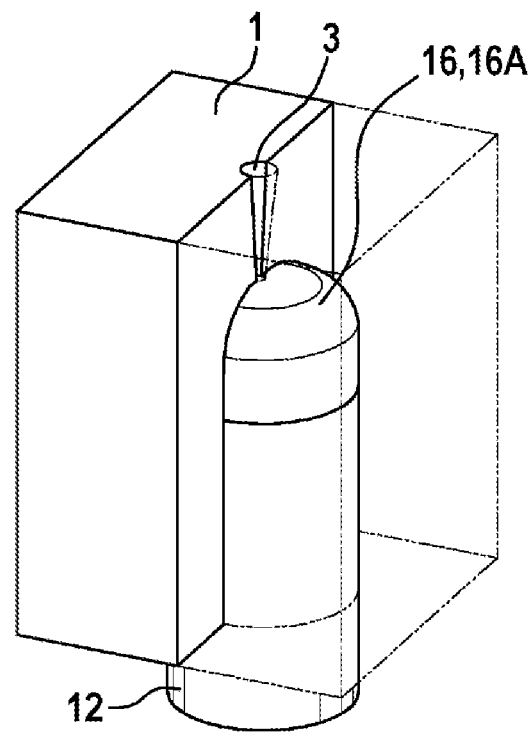
FIG. 6 shows a schematic perspective partially transparent representation of the injection molding tool from FIG. 5 after a plastic bonded permanent magnetic material has been introduced.

As can further be seen in FIG. 3, in the method 100 according to the disclosure for fixing a sensor 16 to a moving body 10, in step S100, a body 10 is provided at the free end of which a fixing geometry 14 is formed. In step S110, the free end of the body 10 with the fixing geometry 14 is inserted into a cavity 5 represented in FIG. 5 of an injection molding tool 1. In step S120, plastic bonded permanent magnetic material is introduced into the cavity 5 of the injection molding tool 1 via a filler opening 3, such that the cured plastic bonded permanent magnetic material forms a free end of the body 10 as an extension of the body 10. FIG. 5 shows the injection molding tool 1 after the plastic bonded permanent magnetic material has been introduced into the cavity 5. In step S130, the permanent magnetic material is magnetized in order to form a permanent magnet 16A. In one alternative exemplary embodiment of the method 100 according to the disclosure which is not represented, the magnetization of the permanent magnet does not take place in a separate step S130, but rather is already carried out in step S120 during the filling and curing process of the plastic bonded permanent magnetic material, so that the method 100 according to the disclosure for fixing a sensor 16 to a moving body 10 can be completed more quickly.

In the exemplary embodiment represented, the permanent magnetic material is integrated into granules of an injection-moldable plastics material before being introduced into the cavity 5 of the injection molding tool 1. In one alternative exemplary embodiment which is not represented, the permanent magnetic material in powder form is mixed with injection-moldable plastics material before being introduced into the cavity 5 of the injection molding tool 1. The fixing geometry 14 of the body 10 is designed in such a way and the plastic bonded permanent magnetic material is introduced into the cavity 5 of the injection molding tool 1 in such a manner that, after curing the introduced plastics material, a radial and axial positive engagement is formed between the permanent magnet 16A formed therefrom and the fixing geometry 14 of the body 10.

Embodiments of the sensor according to the disclosure and of the method according to the disclosure for fixing a sensor to a moving body 10 can also be used for the detection of translational movements of a body 10 designed as a rod relative to a measurement transducer 24. In the case of the body 10 designed as a rod, the influence of the magnetic field detected by the measurement transducer 24 is evaluated, in order to calculate a current distance covered and/or a current speed of displacement of the rod.

The invention claimed is:

1. A sensor for a magnetic measuring device for detecting a rotational or translational movement of a shaft, comprising:
   a permanent magnet connected in a rotationally fixed manner to the shaft so as to move together with the shaft, the permanent magnet including a plastic bonded permanent magnetic material injection molded onto the shaft as an extension of the shaft that forms a free end of the shaft; and
   a fixing geometry of the shaft including a protruding structure with a mushroom-shaped protrusion cross section and a surrounding protrusion undercut,
   wherein the protruding structure protrudes directly from the shaft,
   wherein the permanent magnet completely encloses the protruding structure, such that a radial and axial positive engagement is formed between the permanent magnet and the shaft,
   wherein the shaft is cylindrical and defines a first diameter and a rotational axis,
   wherein the permanent magnet defines a cylindrical portion having a second diameter that is equal to the first diameter at an intersection of the cylindrical portion with the shaft,
   wherein the first diameter of the cylindrical portion is constant in a direction extending away from the shaft along the rotational axis,
   wherein the permanent magnet defines a tapered portion extending from the cylindrical portion opposite the intersection of the cylindrical portion with the shaft along the rotational axis,
   wherein the tapered portion has a plurality of diameters that decrease in size in the direction extending away from the shaft along the rotational axis,
   wherein the permanent magnet defines a front surface that intersects the tapered portion, the front surface being circular and flat, and the front surface defining a distal end of the permanent magnet, and
   wherein a third diameter of the front surface is substantially equal to a smallest diameter of the plurality of diameters of the tapered portion.

2. The sensor as claimed in claim 1, wherein the permanent magnet is diametrically magnetized or magnetized in a multipolar manner.

3. The sensor as claimed in claim 1, wherein the shaft is rotatably mounted or translationally movable about the rotational axis.

4. A method for fixing a sensor to a shaft, comprising:
   inserting an end of the shaft into a cavity of an injection molding tool, wherein a fixing geometry of the shaft includes a protruding structure with a mushroom-shaped protrusion cross section and a surrounding protrusion undercut, and the protruding structure protrudes directly from the inserted end of the shaft;
   introducing plastic bonded permanent magnetic material into the cavity of the injection molding tool, such that the plastic bonded permanent magnetic material cures and forms a free end of the shaft as an extension of the shaft that completely encloses the protruding structure, such that a radial and axial positive engagement is formed between the introduced permanent magnetic material and the shaft; and
   magnetizing the introduced permanent magnetic material in order to form a permanent magnet,
   wherein the shaft is cylindrical and defines a first diameter and a rotational axis,
   wherein the permanent magnet defines a cylindrical portion having a second diameter that is equal to the first diameter at an intersection of the cylindrical portion with the shaft,
   wherein the first diameter of the cylindrical portion is constant in a direction extending away from the shaft along the rotational axis,
   wherein the permanent magnet defines a tapered portion extending from the cylindrical portion opposite the intersection of the cylindrical portion with the shaft along the rotational axis,
   wherein the tapered portion has a plurality of diameters that decrease in size in the direction extending away from the shaft along the rotational axis,
   wherein the permanent magnet defines a front surface that intersects the tapered portion, the front surface being circular and flat, and the front surface defining a distal end of the permanent magnet, and
   wherein a third diameter of the front surface is substantially equal to a smallest diameter of the plurality of diameters of the tapered portion.

5. The method as claimed in claim 4, further comprising:
   integrating permanent magnetic material into granules of an injection-moldable plastics material so as to form the plastic bonded permanent magnetic material before introducing the plastic bonded permanent magnetic material into the cavity of the injection molding tool.

6. The method as claimed in claim 4, further comprising:
   mixing permanent magnetic material in powder form with injection-moldable plastics material so as to form the plastic bonded permanent magnetic material before introducing the plastic bonded permanent magnetic material into the cavity of the injection molding tool.

7. The method as claimed in claim 4, wherein the fixing geometry and the plastic bonded permanent magnetic material introduced into the cavity are configured such that, after curing plastics material of the plastic bonded permanent magnetic material, the radial and axial positive engagement is formed between the permanent magnet and the fixing geometry.

8. A magnetic measuring device, comprising:
   a shaft formed with a protruding structure configured to protrude from an end face of the shaft, the protruding structure having a mushroom-shaped cross section, and the protruding structure integrally formed with the shaft;
   a permanent magnet connected in a rotationally fixed manner to the shaft so as to move together with the shaft, the permanent magnet including a plastic bonded permanent magnetic material injection molded onto the shaft as an extension of the shaft that forms a free end of the shaft; and a measurement transducer arranged in a stationary manner and operably connected to the permanent magnet, wherein, depending on movement of the shaft, the permanent magnet influences at least one magnetic variable of a magnetic field detected by the measurement transducer, wherein the permanent magnet is configured to contactlessly influence the measurement transducer to detect movement of the shaft, wherein the permanent magnet completely encloses the protruding structure, such that a radial and an axial positive engagement is formed between the permanent magnet and the shaft, wherein the shaft is cylindrical and defines a first diameter and a rotational axis, wherein the permanent magnet defines a cylindrical portion having a second diameter that is equal to the first diameter at an intersection of the cylindrical portion with the shaft, wherein the first diameter of the cylindrical portion is constant in a direction extending away from the shaft along the rotational axis, wherein the permanent magnet defines a tapered portion extending from the cylindrical portion opposite the intersection of the cylindrical portion with the shaft along the rotational axis, wherein the tapered portion has a plurality of diameters that decrease in size in the direction extending away from the shaft along the rotational axis, wherein the permanent magnet defines a front surface that intersects the tapered portion, the front surface being circular and flat, and the front surface defining a distal end of the permanent magnet, and wherein a third diameter of the front surface is substantially equal to a smallest diameter of the plurality of diameters of the tapered portion.

9. The magnetic measuring device as claimed in claim 8, further comprising:

a control apparatus operably connected to the measurement transducer, wherein the influence of the magnetic field detected by the measurement transducer is evaluated by the control apparatus to calculate a current rotation angle and/or a current rotational speed of the shaft.

10. The magnetic measuring device as claimed in claim 8, further comprising:

a control apparatus operably connected to the measurement transducer, wherein the influence of the magnetic field detected by the measurement transducer is evaluated by the control apparatus to calculate a current distance covered and/or a current speed of displacement of the shaft.

11. The magnetic measuring device as claimed in claim 8, wherein the free end of the shaft with the permanent magnet projects into a hollow space, and the measurement transducer is arranged inside or outside the hollow space.

12. The magnetic measuring device as claimed in claim 8, further comprising:

an application-specific integrated circuit ("ASIC") module in which the measurement transducer and a sensor interface are arranged.

* * * * *